United States Patent Office 3,737,485
Patented June 5, 1973

3,737,485
TRIPENTAERYTHRITOL TETRAPHOSPHITE
Ingenuin Hechenbleikner, West Cornwall, Conn., assignor to Weston Chemical Co., Inc., Montvale, N.J.
No Drawing. Filed Dec. 30, 1971, Ser. No. 214,372
Int. Cl. C07d 105/04; C08f 45/58
U.S. Cl. 260—927 R           1 Claim

ABSTRACT OF THE DISCLOSURE

The compound bis-3,9(4-oxymethyl-1-phospha - 2,6,7-trioxabicyclo (2,2,2) octane)-2,4,8,10-tetraoxa - 3,9 - diphospha-spiro (5,5) undecane is prepared. It is useful for stabilizing halogen containing resins, hydrocarbons, polymers, etc.

---

The present invention relates to a novel phosphite compound useful in the manner of other phosphites to stabilize halogen containing resins, hydrocarbons, etc.

The compound of the present invention is bis-3,9(4-oxymethyl - 1 - phospha - 2,6,7 - trioxabicyclo (2,2,2) octane-2,4,8,10-tetraoxa-3,9-diphospha-spiro (5,5) undecane having the formula:

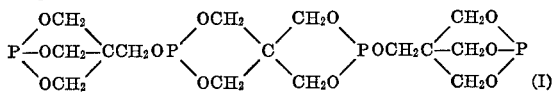
(I)

The compound of Formula I can be prepared reacting one mole of a compound having the formula:

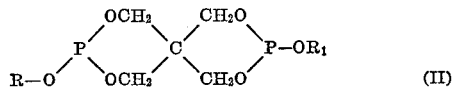
(II)

when R and $R_1$ are alkyl, haloalkyl, aryl or haloaryl, e.g., methyl, ethyl, decyl, stearyl, phenyl, tolyl, chloroethyl, chlorophenyl, bromophenyl, with 2 moles of hydroxymethyl bicyclophosphite of the formula:

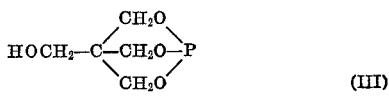
(III)

and removing the phenol or alcohol formed.

The compounds of Formula II include diphenyl pentaerythritol diphosphite, ditolyl pentaerythritol diphosphite, dimethyl pentaerythritol diphosphite, diethyl pentaerythritol diphosphite, diisodecyl pentaerythritol disphosphite, distearyl pentaerythritol diphosphite, di-p-chlorophenyl pentaerythritol diphosphite, di-o-bromophenyl pentaerythritol diphosphite, and di-2-chloroethyl pentaerythritol diphosphite and are disclosed for example in Hechenbleikner Pat. 2,847,443, Baranauckas Pat. 3,310,609, Hechenbleikner Pat. 3,205,250, Gould Pat. 2,961,454 and Hechenbleikner Pat. 3,281,381.

The compound of Formula III is disclosed in Hechenbleikner Pat. 3,293,327 and Ainsworth Pat. 3,000,850.

The compound of the present invention (Formula I), it may be observed, is isomeric with the compound of Baranauckas Pat. 3,310,609 claim 2 and has all the uses of the Baranauckas compound as disclosed in Baranauckas and in divisional Baranauckas Pat. 3,412,051.

It should be observed that the formula of the present compound is completely different, however, than that of the Baranauckas compound.

In preparing the compound of the present invention, there are usually employed the conventional catalysts for transesterification of phosphites. Such catalysts are usually employed in an amount of 0.5 to 1.5% of the reactants and include for example alkaline materials such as alkali metals, e.g., sodium or potassium, alkali metal and alkaline earth metal alcoholates and phenolates, e.g., sodium methylate, potassium methylate, lithium methylate, sodium ethylate, sodium isopropylate, sodium decylate, sodium octadecylate, sodium phenate, potassium phenate, sodium cresylate, calcium ethylate and the like. Secondary phosphites can also be used as catalysts, e.g., diphenyl phosphite, dimethyl phosphite, diisodecyl phosphite and the other secondary phosphite catalysts disclosed in Friedman Pat. 3,047,608.

Unless otherwise indicated all parts and percentages are by weight.

The compound of Formula I can be prepared under a wide temperature range, e.g., 100 to 300° C. or at reflux temperature. Preferably the reaction is carried out at temperatures and pressures which will allow the by-product phenol or alcohol formed to be removed by distillation, usually in a vacuum.

EXAMPLE 1

Diphenyl pentaerythritol diphosphite (known as Dipentite) in an amount of 380 grams (1 mole) was mixed with hydroxymethylbicyclophosphite in an amount of 326 grams (2 moles) and there were added 3 grams of sodium phenate. The mixture was then heated while stripping off 2 moles of phenol under a vacuum. The final temperature was 200° C. at 10–15 mm. The product (Formula I) obtained after digestion with toluene and drying melted at 230–240° C. The yield was about 90–95% of the theoretical. Analysis for phosphorus showed that the compound contained 24% phosphorus (theory 23.8%). Infrared showed no absorption characteristic of phenyl groups or of hydroxy groups.

The compound of Formula I as previously stated is useful whenever phosphite stabilizers are useful. Also because of its high phosphorus content it is useful as a fire retardant additive in polyurethane compositions, e.g., in the manner described in Baranauckas Pat. 3,310,609 Example 4.

The compound of Formula I of the present invention prevents processing degradation of olefin and vinyl halide polymers in the melt and exhibits synergistic stability with ultraviolet light stabilizers, e.g., benzophenones such as 2-hydroxy - 4 - methoxy-benzophenone, 2,2$^1$-dihydroxy-4-methoxy benzophenone, 2,2$^1$-dihydroxy-4-n-octoxy benzophenone, and 2-hydroxy-4-n-octoxy benzophenone, benzotriazoles, e.g., 2(2$^1$-hydroxy-5$^1$-methyl phenol) benzotriazoles, etc.

When the compound of Formula I of the invention is used to stabilize polymers, it is used in an amount of 0.005 to 10 parts per 100 parts of polymer. Usually it is used in olefin polymers in an amount of 0.05–1%, preferably 0.1–0.5%, and with vinyl halide polymers in an amount of 0.2–1.0%.

The compound of Formula I can be used as a heat and light stabilizer for resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g., vinyl chloride, are vinyl esters of carboxylic acids, e.g., vinyl acetate, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g., methyl methacrylates and butyl methacrylate, vinyl aromatic compounds, e.g., styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric and the like. Specific examples of such esters are diethyl maleate, dibutyl maleate and dibutyl fumarate.

The copolymers in which at least 50% of the copolymer is made from a halogen containing vinylidene compound such as vinyl chloride are preferably treated according to the invention.

The stabilizer of the present invention is also effective when intimately mixed with halogen containing resins in which part or all of the halogen is introduced into a preformed resin, e.g., chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl, chloride-vinyl acetate (95:5 weight ratio, vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g., polyvinyl chloride, can either be plasticized or unplasticized. As the plasticizer there can be employed conventional mateials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g., 10 to 100 parts for each 100 parts of the vinyl chloride containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium - 2 - ethylexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, zinc stearate, zinc octoate, cadmium benzoate, cadmium p-tert butylbenzoate, barium octyl salicylate, cadmium epoxy stearate, strontium epoxy stearate. For food grade uses non-toxic stabilizers should be used such as the calcium and zinc salts.

In plastisol formulations there is preferably also included from 0.1 to 10 parts per 100 parts of resin of an epoxy vegetable oil such as epoxidized soybean oil or epoxidized tall oil.

The stabilizer of the present invention is particularly effective as color stabilizers and melt flow stabilizers for olefin polymers such as polyethylene, polypropylene, ethylene propylene copolymers (e.g. 50:50, 80:20 and 20:80), ethylene-monoolefin copolymers wherein the monoolefin has 4-10 carbon atoms and is present in a minor amount, e.g., ethylene-butene-1 copolymer (95:5) and ethylene-decene-1 copolymer (90:10). Furthermore, they can be used to stabilize natural rubber, styrene-butadiene rubber (SBR rubber), e.g., (75% butadiene–25% styrene), EPDM rubbers, ABS terpolymers (e.g. 20–30% acrylonitrile, 20–30% butadiene, 40–60% styrene), polyisoprene, polybutadiene, styrene-acrylonitrile copolymers, butyl rubber, polyacrylonitrile and acrylonitrile copolymers (e.g. acrylonitrile-vinyl chloride 85:15), polystyrene, impact modified polystyrene, butadiene acrylonitrile (e.g. 60:40); polymerized acrylates and methacrylate, e.g. polymethyl acrylate, polymethyl methacrylates and polybutyl acrylate polyacetals, e.g. polyoxymethylene polymers (e.g. Delrin and Celcon) polycarbonates (e.g. bisphenol A-carbonate polymer), polysulfones, polyphenyleneoxides, phenoxy resins, epoxy resins, A-epichlorhydrin, nylon, cellulose acetate, cellulose acetate-propionate, cellulose acetate-butyrate, cellulose nitrate, ethyl cellulose, linear polyesters, e.g. polyethylene terephthalate (Dacron, Mylar), unsaturated polyesters, e.g. vinyl compounds modified alkyds such as ethylene glycol phthalate-maleate modified with styrene or diallyl phthalate, oil modified alkyd resins, e.g. soybean oil-glyceryl phthalate resin, chlorosulfonated polyethylene, polyurethanes (e.g. toluene dissocyanate reaction products with polypropylene glycol molecular weight 2025 or with glycerine-ethylene oxide adduct having a hydroxyl number of 56).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims, the term nonconjugated polyolefin includes aliphatic nonconjugated polyene hydrocarbons and cycloaliphatic nonconjugated polyene hydrocarbons, e.g. endocyclic dienes. Specific examples of suitable nonconjugated polyolefins include pentadiene-1,4; hexadiene-1,4' dicyclopentadiene, methyl cyclopentadiene dimer, cyclodedecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP–404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in United States Pats. 2,933,480; 3,000,866; 3,063,973; 3,093,620; 3,093,621, and 3,136,739, in British Pat. 880,904 and in Belgium Pat. 623,698.

There can also be included thio compounds in an amount of 0.01 to 10%, usually 0.1 to 5% of the polymer. Thus, there can be used pentaerythritol tetra (mercaptoacetate), 1,1,1-trimethylolethane tri (mercaptoacetate), 1,1,1 - trimethylolpropane tri(mercaptoacetate), dioleyl thiodipropionate, dilauryl thiodipropionate, other thio compounds include distearyl 3,3' - thiodipropionate, dicyclohexyl - 3,3' - thiodipropionate, dicetyl - 3,3'-thiodipropionate, dioctyl-3,3'-thiodipropionate, dibenzyl-3,3'-thiodipropionate, lauryl myristyl-3,3'-thiodipropionate, diphenyl - 3,3' - thiodipropionate, di-p-methoxyphenyl-3,3'-thiodipropionate, didecyl - 3,3' - thiodipropionate, dibenzyl - 3,3' - thiodipropionate, diethyl - 3,3'-thiodipropionate, lauryl ester of 3-methyl-mercapto propionic acid, lauryl ester of 3-butylmercapto propionic acid, phenyl ester of 3-octylmercapto propionic acid, lauryl ester of 3-phenylmercapto propionic acid, lauryl ester of 3 benzylmercapto propionic acid, lauryl ester of 3-(p-methoxy) phenylmercapto propionic acid, lauryl ester of 3-cyclohexylmercapto propionic acid, lauryl ester of 3-hydroxymethylmercaptopropionic acid, myristyl ester of 3-hydroxy - ethylmercapto propionic acid, octyl ester of 3-methoxy - methylmercapto propionic acid, dilauryl ester of 3 - carboxyl - methylmercapto propionic acid, dilauryl ester of 3-carboxyl-propylmercapto propionic acid, dilauryl-4,7 - dithiasebacate, dilauryl - 4,7,8,11-tetrathiotetradecandioate, dimyristyl - 4,11 - dithiatetradecandioate, lauryl - 3 - benzothiazylmercaptopropionate. Preferably the esterifying alcohol is an alkanol having 10 to 18 carbon atoms. Other esters of beta thiocarboxylic acids set forth in Gribbins Pat. 2,519,744 can also be used.

Likewise, there can be included 0.01–10%, usually 0.1–5% in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously. For food grade uses again calcium and zinc salts are preferred.

There can also be added phenolic antioxidants in an amount of 0.01–10%, preferably 0.1–5%. Examples of such phenols include 2,6-di-t-butyl-p-cresol (Ionol), butylated hydroxyanisole, propyl gallate, 4,4'-thiobis (6-t-butyl - m - cresol), 4,4' - cyclohexylidene diphenol, 2,5 - di - t - amyl hydroquinone, 4,4' - butylidene bis(6-t-butyl-m-cresol), hydroquinone monobenzyl ether, 2,2' - methylene - bis(4 - methyl - 6 - t - butylphenol) (Catalin 14), 2,6 - butyl - 4 - decylooxyphenyol, 2,5 - butyl-4-dodecyloxyphenol, 2 - t - butyl - 4 - octadecyloxyphenol, 4,4'-methylene-bis (2,6 - di - t - butyl phenol), p-aminophenol, N - lauryloxy - p - aminophenol, 4,4' - thiobis (3-methyl-6 - t - butylphenol), bis [o - 1,1,3,3 - tetramethylbutyl phenol] sulfide, 4 - acetyl - β - resorcylic acid, A stage p - t - butylphenolformaldehyde resin, crotonaldehyde condensate of 3 - methyl - 6 - t - butyl-phenol, 2,6-di-t-butyl p-cresol (Toponol CA), 2,2-methylene bis 4-ethyl-6-t-butylphenol (AO–425), 4 - dodecyloxy - 2 - hydroxybenzophenone, 3 - hydroxy - 4 - (phenylcarbonyl) phenyl palmitate, n-dodecyl ester of 3 - hydroxy - 4(phenylcarbonyl) phenoxyacetic acid, and t-butyl-phenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins (epichlorhydrin-diphenylolpropane resins), phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glyciodol, vinyl cyclohexene dioxide, glycidyl ether of resorcinol, glycidol ether of 1,5-dihydroxynaphthalene, epoxidized linseed oil fatty acids, allyl glycidyl ether, butyl glycidyl ether, cyclohexane oxide, 4(2,3-epoxypropoxy) acetophenone, mesityl oxide epoxide, 2-ethyl-3-propyl glycidamide, mesityl oxide epoxide, 2-ethyl-3-propyl glycidamide, glycidyl ethers of glycerine, pentaerythritol and sorbitol, and 3,4-epoxy-cyclohexane-1, 1-dimethanol bis-9,10-epoxy-stearate.

EXAMPLE 2

|  | Parts |
|---|---|
| Polyvinyl chloride | 100 |
| Compound of Example 1 | 0.25 |
| Calcium-zinc stearate | 1.0 |

This composition was useful for making bottles for food uses which had good heat and light stability, e.g., it had better stability against discoloration at 350° F. than a similar sample omitting the phosphite.

EXAMPLE 3

|  | Parts |
|---|---|
| Polyvinyl chloride | 100 |
| Compound of Example 1 | 0.3 |
| Calcium stearate | 1.0 |

The polyvinyl chloride product prepared had heat and light stability, noticeably better than a similar sample omitting the phosphite.

EXAMPLE 4

|  | Parts |
|---|---|
| Polypropylene | 100 |
| Compound of Example 1 | 1.25 |
| Calcium stearate | 0.1 |

EXAMPLE 5

|  | Parts |
|---|---|
| Polypropylene | 100 |
| Compound of Example 1 | 0.5 |
| Calcium stearate | 0.1 |
| 2-hydroxy-4-n-octoxy benzophenone | 0.5 |

EXAMPLE 6

2 parts of the phosphite of Formula 1 and 1 part of 4,4'-isopropylidene bisphenol were mixed with 100 parts of solid polypropylene (melt index 0.8) to increase the oxidative stability of the polypropylene.

EXAMPLE 7

|  | Parts |
|---|---|
| Polypropylene (melt index 0.8) | 100 |
| Compound of Formula 1 | 0.2 |
| Dilauryl thiodipropionate | 0.3 |
| 4,4'-methylene bis(3-methyl-6-t-butylphenol) | 0.3 |

What is claimed is:
1. A compound having the formula

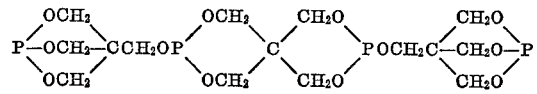

References Cited
UNITED STATES PATENTS 3,310,609  3/1967  Baranauckas et al. __ 260—927 R LEWIS GOTTS, Primary Examiner A. H. SUTTO, Assistant Examiner U.S. Cl. X.R.

260—45.8 R, 45.95, 982